Sept. 26, 1961 O. H. WINN 3,002,113

PULSE FORMING APPARATUS

Filed March 26, 1956 2 Sheets-Sheet 1

INVENTOR:
OLIVER H. WINN,
BY Michael Masnik
HIS AGENT.

Sept. 26, 1961 O. H. WINN 3,002,113

PULSE FORMING APPARATUS

Filed March 26, 1956

2 Sheets-Sheet 2

INVENTOR:
OLIVER H. WINN,
BY Michael Masnik
HIS AGENT.

3,002,113

PULSE FORMING APPARATUS

Oliver H. Winn, Whitesboro, N.Y., assignor to General Electric Company, a corporation of New York Filed Mar. 26, 1956, Ser. No. 573,903
3 Claims. (Cl. 307—106)

This invention relates to signal processing systems and particularly to an arrangement for providing recurrent pulses.

In the field of obstacle detection, industrial timing controls, etc., a need exists for generating pulses of predetermined shape at selectable recurrence or repetition rates. Prior arrangements for fulfilling this need have either required a relatively complex and expensive apparatus or exhibited a degree of unreliability, instability and inflexibility which was not always tolerable.

Accordingly, it is an object of my invention to provide an improved signal processing system.

It is another object of my invention to provide an arrangement for generating pulses related to the frequency of an alternating voltage source.

Another object of my invention is to provide apparatus for generating pulses at a selectable recurrence rate.

Another object of my invention is to provide a pulse forming circuit.

A further object of my invention is to provide an improved wave shaping apparatus.

A pulse generating circuit constructed in accordance with one embodiment of the present invention comprises a plurality of energy storage networks coupled to a pulse forming network by saturable inductors. The saturable inductors have an inductance which varies rapidly in response to a predetermined energy condition in the energy-storage network. Energy is supplied to the energy storage network and means are provided for deriving pulses of desired form and repetition frequency from the pulse forming network.

In accordance with another embodiment, means are provided to allow selection between several desirable pulse shapes and repetition frequencies.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings in which:

FIGURE 1*a* is a schematic diagram of a signal shaping network providing an output pulse repetition frequency twice that of the source frequency; FIGURES 1*b* and 1*c* represent operating characteristics of portions of the circuit shown in FIGURE 1;

Figure 5:
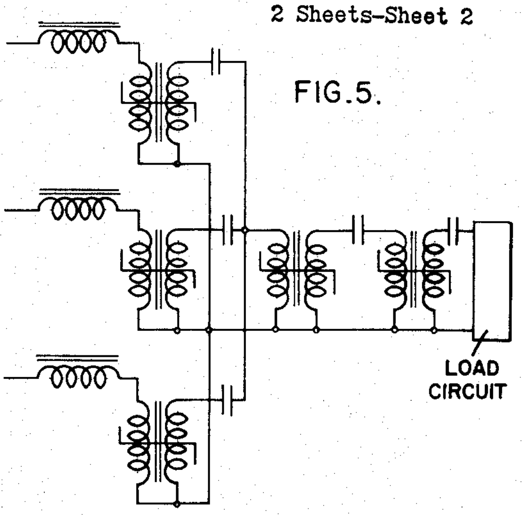
FIGURE 5 is a schematic diagram of a modification of the circuit shown in FIGURE 4 for a three phase Y supply.
Figure 6A:
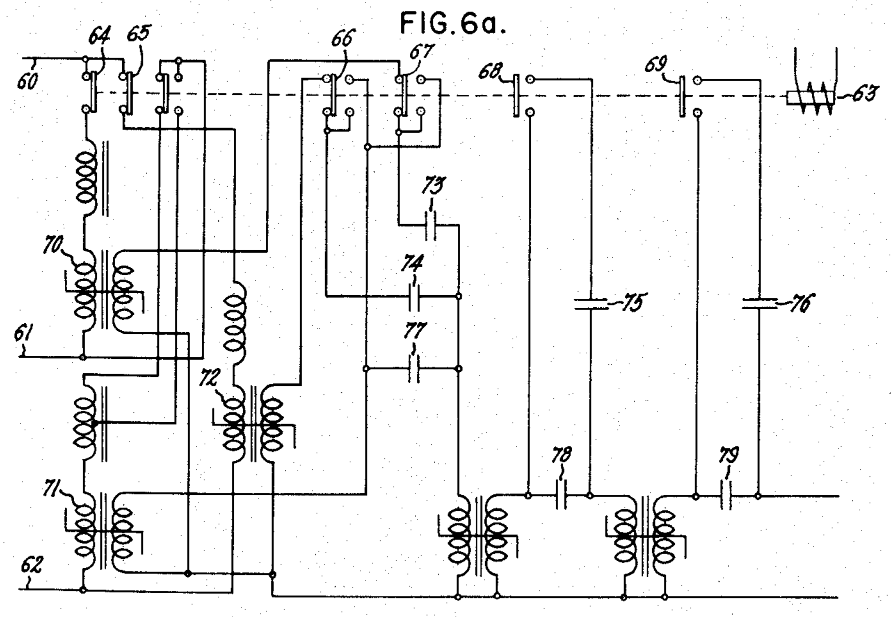
Figure 6B:
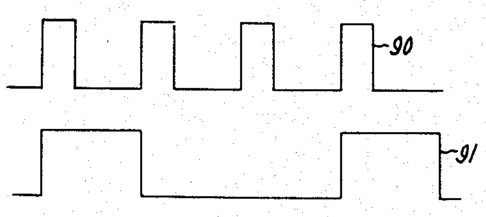

FIGURE 6*a* is a schematic diagram of a modification of the circuit shown in FIGURE 5 for producing two selectable pulse widths and repetition frequency; and FIGURE 6*b* represents operating characteristics of a portion of the circuit shown in FIGURE 6.

Figure 1A:
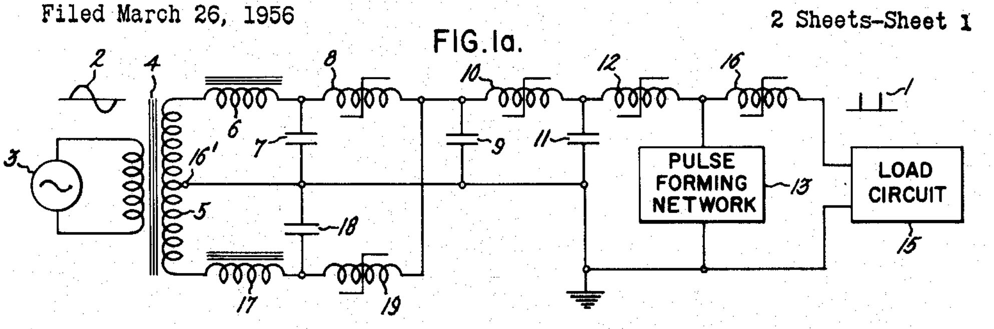
Figure 1B:
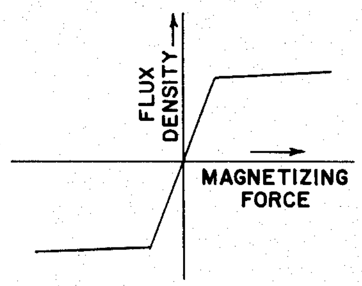

Referring to FIGURE 1 there is shown one embodiment of applicant's invention wherein an output pulse 1 is derived for each half cycle of the alternating voltage waves 2 supplied by a source 3. Transformer 4 operates to transform the voltage available from 3 to the desired output operating level across the secondary winding 5. Linear reactor 6 and capacitor 7 are dimensioned to be resonant at the source frequency *f* for efficient signal storage. Element 8 comprises a saturable reactor which is adapted to integrate the positive going voltage appearing across the capacitor 7 and to change its impedance abruptly when the integrated voltage reaches a predetermined value. The characteristics of a core of a saturable inductor suitable for use in such application is shown in FIGURE 1*b* wherein magnetizing force is plotted as abscissa and flux density as ordinate. The saturable inductor is dimensioned so that saturation, associated with minimum impedance of the reactor, occurs approximately at the maximum energy storage on the storage element, capacitor 7. The inductance of the saturable reactor 8, while it is saturated, determines how sharp the succeeding wave developed across capacitor 9 becomes. In a similar manner the saturable reactor 10 operates at a predetermined time to transfer the voltage stored in capacitor 9 into capacitor 11. In one embodiment capacitors 8, 9, and 11 were dimensioned to be the same and the saturable reactors dimensioned to provide the desired wave shape improvement. The constants of each of the succeeding network portions comprising a saturable reactor and capacitor were adjusted such that the resonant frequency improved **20*n***, where *n* is the number of network portions employed in the pulse shaping network.

The last discharge by saturable reactor 12 occurs into the pulse forming network 13 which may be of conventional form such as an artificial delay line for modifying the available wave shape to a suitable form for application to the load circuit 15. In the embodiment of FIGURE 1, the saturable reactor 16 operates effectively as a high impedance, or open switch to isolate the load circuit while the preceding networks are being charged and operates as a low impedance, or closed switch when transferring the shaped pulse 1 to the load circuit, which can be the primary of a magnetron-pulsing transformer.

Figure 1C:
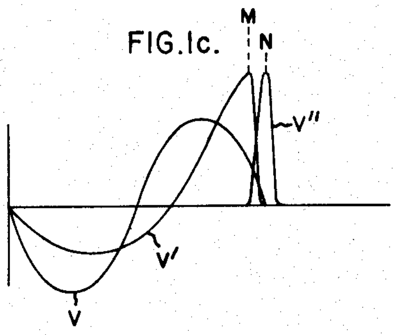

In order that the output pulse delivered to the load circuit is of a higher repetition rate than that of the frequency of wave 2, the secondary winding 5 is provided with a grounded center tap 16′ and a series of reactor-capacitor networks similar to that previously described. The linear reactor 17 and capacitor 18 are resonant to the frequency of waves 2 and operate in a manner similar to that of elements 6 and 7. The saturable reactor 19 operates like reactor 8 to transfer the integrated voltage developed across capacitor 18 at the proper time into capacitor 9 whereupon it is successively transferred down the described reactor-capacitor circuits and pulse forming network to the load circuit 15. It should be noted that all of the saturable reactors were adapted to operate only on the positive going voltage cycle. Accordingly, the reactors 8, 10, 12 and 16 operate during the first half cycle of the output voltage developed across the secondary winding 5 whereas reactors 19, 10, 12, and 16 operate during the succeeding half cycle of the output voltage developed by the transformer 4. The shaping of the pulse and the increase in frequency is illustrated by FIGURE 1*c* wherein voltage is plotted as ordinate to a common time scale as abscissa waveforms V and illustrates voltage impressed by transformer 4 on inductor 6. Waveform V′ illustrates the voltage developed across capacitor 7. Waveform V″ illustrates voltage developed across capacitor 9. M is the point at which inductor 8 saturates and becomes a low impedance element. The point N corresponds to breakdown of the following inductor 10. The waveforms appearing at inductor 17 and capacitor 18 are identical with those at inductor 6 and capacitor 7 except they are shifted in time by an interval corresponding to one-half cycle of the impressed A.C. wave V. The result is that a wave similar to V'' appears across capacitor 9 each half cycle so that the resulting recurrence rate of pulses at the load is twice the frequency of the input voltage.

Figure 2:
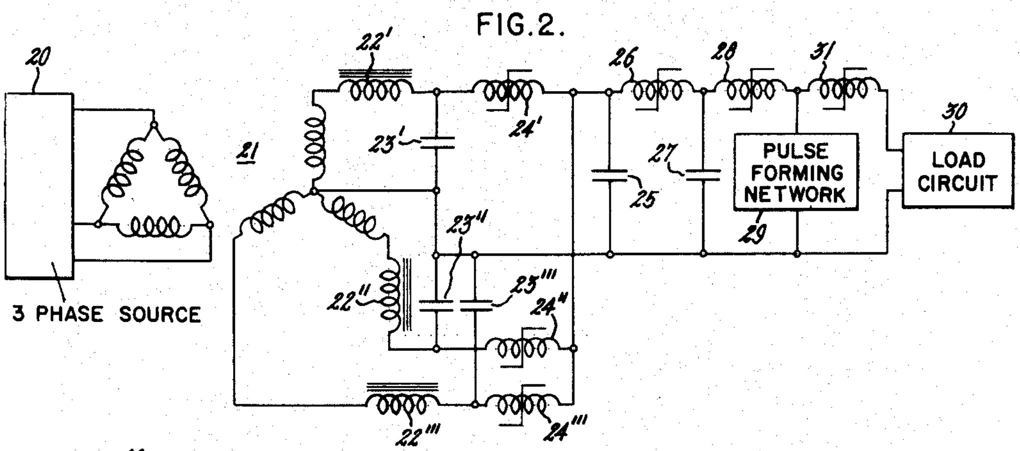
FIGURE 2 is a schematic diagram of a modification of the circuit of FIGURE 1 used with a three-phase supply.

Referring to FIGURE 2 a further embodiment of the invention is shown for deriving three output pulses for each cycle of the frequency of the input voltage source 20. The three-phase transformer 21 transforms the output voltage from source 20 to the desired operating level. If the output from source 20 is at the proper level, the transformer can be omitted. The linear reactors 22 and the capacitors 23 each associated with a respective secondary winding of the transformer 21, operate as previously described in FIGURE 1. The reactors 24', 24'' and 24''' operate during their respective positive going half cycles to transfer the integrated voltage developed across their associated capacitors 23', 23'', and 23''' to the saturable reactor-capacitor chain 25—28 feeding the pulse forming network 29 and the load circuit 30. Saturable reactor 31 operates effectively as a switch as previously described. It is obvious to those skilled in the art that the principles described with respect to FIGURES 1 and 2 can be employed for use with other multiphase systems using different transformer secondary connections with a three-phase input. It should be noted that each of the saturable reactor-capacitor networks 23—24 need only handle one third of the average output load since each actually fires at one third the output repetition frequency.

Figure 3:
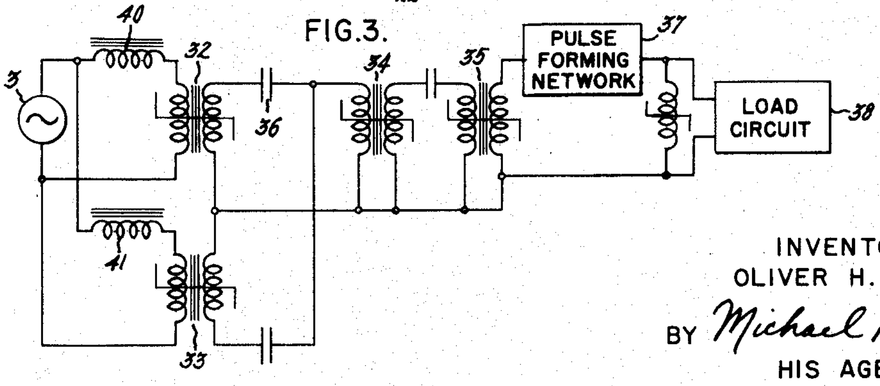
FIGURE 3 is a schematic diagram of a modification of FIGURE 1, using saturable transformers.

FIGURE 3 shows an arrangement for deriving substantial savings in the number of components employed for deriving the desired degree of wave shaping. The circuit utilizes saturating transformers in place of the reactors previous described. The saturating transformers 32 and 33 serve the two-fold purpose of the voltage transformation as well as pulse shaping. It should be noted that the unsaturated impedance of each of the transformers 32, 34, 35 and 33, 34 and 35 is greater than its saturated impedance and that in its unsaturated condition the impedance of each transformer is smaller than the unsaturated impedance of the preceding transformer of the series, and similarly the impedance of each transformer during its saturated condition is smaller than the unsaturated impedance of the following transformer in the series. The transformer 32 is dimensioned to saturate when a sufficient voltage, available at its input terminals, has been integrated to cause the transformer to saturate at which time its impedance is much less than that of the succeeding transformer which still is in the unsaturated state. The inductance of the transformer 32 in its saturated condition and the effective inductance of transformer 34 in its unsaturated condition together with the capacitance 36, determines the rise time of the voltage developed across the primary of the saturable transformer 34.

In a manner similar to that previously described, each of the succeeding transformers 34 and 35 transfer the integrated voltage developed across its windings to the succeeding saturable reactor stages, the pulse forming network 37 and ultimately to the load circuit 38. In this embodiment is shown an arrangement for rapid discharge of a delay time type of pulse forming network in a saturable inductor. In a manner similar to that described with respect to FIGURE 1, the saturable transformer 32 and capacitor 36 operate during the alternate half cycles of the source 3 to transfer a shaped pulse to the succeeding saturable transformers 34 and 35. The linear inductances 40 and 41 are provided to facilitate suitable wave shaping of the input wave before a transfer into the succeeding saturable reactor stages.

Figure 4:
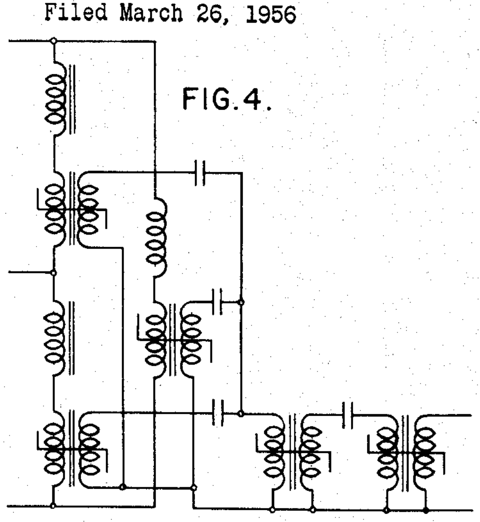
FIGURE 4 is a schematic diagram of the circuit of FIGURE 3 with a three-phase delta supply.

FIGURE 4 operates in a similar manner while employing a three-phase delta-input. FIGURE 5 shows a similar arrangement using a three-phase Y-input.

The same principle can be used for 4, 6, 12 etc. phase systems using different transformer secondary connections.

FIGURE 6*a* illustrates an embodiment of the invention whereby a selectable pulse rate integrally related to the frequency of the input source may be derived by utilizing common elements. Three-phase power is supplied over leads 60, 61, and 62. Solenoid 63 controls switch contactors 64 through 69. When the contactors are in the position shown, the supplied power is delivered to the saturable transformers 70, 71 and 72 connected in a delta arrangement. When solenoid 63 is energized, power to saturable transformers 70 and 72 are cut off by movement of contactors 64 and 65. At the same time, the capacitance between successive saturable transformers are increased by the additional capacitors, 73 and 74, 75 and 76, connected in parallel with the normal coupling capacitors 77, 78 and 79 respectively. The additional capacitance increases the pulse width.

The longer pulse at a lower repetition frequency is desirable, for example in long range operation of radar apparatus. When a high repetition rate is desired, the solenoid is activated, giving three-phase operations and therefore a repetition frequency of three times that of associated with long range operation. The shorter and longer pulses are illustrated in FIGURE 6*b* as curves 90 and 91 respectively in which time is plotted as abscissa and voltage as ordinate.

It will be recognized by those skilled in the art that bias of the cores of certain reactors in the circuits may be necessary. The bias can be applied by a separate D.C. winding. Such windings are not shown in the interests of simplifying the drawings and description.

While specific embodiments have been shown and described, it will of course be understood that various modifications may yet be devised by those skilled in the art which will embody the principles of the invention and found in the true spirit and scope thereof.

What I claim as new and desire to secure by Letters Patent of the United States is:

1. In combination, a source of alternating electric voltage, a transformer having a primary winding and a center-tapped secondary winding, said secondary winding having a first and second terminal at opposite ends and a third terminal intermediate said ends, means coupling said source to said primary winding, a first and second tuned circuit comprising a serially coupled inductance and capacitance dimensioned to be resonant at the frequency of said source, said first tuned circuit being coupled between said first and third terminals on said secondary winding, said second tuned circuit being coupled between said second and third terminals on said secondary winding, a first saturable inductor, a pulse shaping network, said saturable inductor and said pulse shaping network being serially connected, means coupling said first saturable inductor and said pulse shaping network across said capacitance in said first tuned circuit, a second saturable inductor, said second saturable inductor and said pulse shaping network being serially connected, means coupling said second saturable inductor and said pulse shaping network across said capacitance in said second tuned circuit, an output circuit, means coupling said output circuit to said pulse shaping network.

2. In combination, a source of 3 phase alternating voltage having a first, second and third terminals, a first, second and third saturable transformer, means coupling said first saturable transformer across said first and second terminals of said source, a first operable switch means coupling said second saturable transformer across said first and third terminals of said source, a second operable switch means coupling said third saturable transformer across said second and third terminals of said source, a pulse forming network, said network comprising a plurality of saturable transformers, said transformers being coupled together by a first capacitive means, a third operable switch means adapted to vary said first capacitive means, a second capacitive means coupling said pulse forming network to said first saturable transformer, a fourth operable switch means adapted to vary said second capacitive means, a third capacitive means coupling said pulse forming network to said second saturable transformer, a fifth operable switch means adapted to vary said third capacitive means, a fourth capacitive means coupling said pulse forming network to said third saturable transformer, a sixth operable switch means adapted to vary said fourth capacitive means, means for operating all of said operable switch means simultaneously, an output circuit, means coupling said output circuit to said pulse forming network.

3. In combination, a polyphase source of alternating voltage, a pulse shaping network, said pulse shaping network comprising a cascaded plurality of energy storage and transfer sections to store electrical energy and to transfer said energy in a shorter time than that required for storage, each of said sections comprising a saturable core transformer and a capacitor, time shortening means in each of said sections to shorten the time required for transfer of energy comprising means to change the value of said capacitance, a first saturable core transformer having a substantially rectangular hysteresis curve coupling one of said phases to said pulse shaping network, coupling means simultaneously operable with said time shortening means for coupling each of said phases to said pulse shaping network, said coupling means comprising a saturable core transformer including said first saturable core transformer and having a substantially rectangular hysteresis curve associated with each of said phases, a load circuit, and means to couple said load circuit to the last of said cascaded sections in said pulse shaping network.

References Cited in the file of this patent

UNITED STATES PATENTS

| | | |
|---|---|---|
| 1,180,800 | Taylor | Apr. 25, 1916 |
| 2,166,785 | Aigner | July 18, 1939 |
| 2,659,008 | Floyd | Nov. 10, 1953 |
| 2,692,954 | Young | Oct. 26, 1954 |
| 2,727,159 | Sunderlin | Dec. 13, 1955 |

FOREIGN PATENTS

| | | |
|---|---|---|
| 154,760 | Australia | Feb. 1, 1951 |
| 666,574 | Great Britain | Feb. 13, 1952 |